(12) United States Patent
Tayouri (10) Patent No.: US 11,985,126 B2
(45) Date of Patent: May 14, 2024

(54) METHODS AND SYSTEMS FOR TRUSTED WEB AUTHENTICATION

(71) Applicant: ELTA SYSTEMS LTD., Ashdod (IL)

(72) Inventor: David Tayouri, Rishon LeZion (IL)

(73) Assignee: ELTA SYSTEMS LTD., Ashdod (IL)

( * ) Notice: Subject to any disclaimer, the term of this patent is extended or adjusted under 35 U.S.C. 154(b) by 364 days.

(21) Appl. No.: 17/614,420

(22) PCT Filed: Jun. 14, 2020

(86) PCT No.: PCT/IL2020/050656
§ 371 (c)(1),
(2) Date: Nov. 26, 2021

(87) PCT Pub. No.: WO2020/255117
PCT Pub. Date: Dec. 24, 2020

(65) Prior Publication Data
US 2022/0232007 A1     Jul. 21, 2022

(30) Foreign Application Priority Data
Jun. 19, 2019   (IL) .......................................... 267493

(51) Int. Cl.
*H04L 9/40*     (2022.01)
*G06F 21/32*     (2013.01)
(Continued)

(52) U.S. Cl.
CPC ...... *H04L 63/0861* (2013.01); *H04L 63/0428* (2013.01)

(58) Field of Classification Search
CPC ............ H04L 63/0861; H04L 63/0428; H04L 9/3239; H04L 9/3231; H04L 9/50;
(Continued)

(56) References Cited

U.S. PATENT DOCUMENTS

| | | | |
|---|---|---|---|
| 8,125,980 B2 * | 2/2012 | Hino ..................... | H04L 63/083 370/395.2 |
| 8,225,384 B2 | 7/2012 | Pizano et al. | |

(Continued)

FOREIGN PATENT DOCUMENTS

| | | |
|---|---|---|
| CN | 108667815 A | 10/2018 |
| CN | 109165528 A | 1/2019 |

(Continued)

OTHER PUBLICATIONS

PCT International Search Report for International Application No. PCT/IL2020/050656, dated Aug. 13, 2020, 3pp.

(Continued)

*Primary Examiner* — Darren B Schwartz
(74) *Attorney, Agent, or Firm* — The Roy Gross Law Firm, LLC; Roy Gross (57) ABSTRACT

An identification method which comprises providing at least one database storing, for each of a plurality of users, user data comprising biometric data representative of biometric features of the user, user identification data comprising at least one or more usernames and passwords, each username and password being associated with a website, the method comprising, by at least one processing unit, obtaining biometric data representative of biometric features of a candidate user attempting to be identified by a given website, searching, in the database, biometric data matching the biometric data of the candidate user according to a matching criterion, and sending to the given web site at least a password stored for the candidate user in the database and associated with the given website, wherein the password is encrypted using an encryption mechanism which allows decryption of the password only by the given website.

20 Claims, 6 Drawing Sheets

(51) Int. Cl.
*G06F 21/45* (2013.01)
*G06F 21/64* (2013.01)
*H04L 9/00* (2022.01)
*H04L 9/32* (2006.01)
*H04L 67/02* (2022.01)

(58) Field of Classification Search
CPC ......... H04L 67/02; G06F 21/64; G06F 21/45; G06F 21/32
See application file for complete search history.

(56) References Cited

U.S. PATENT DOCUMENTS

| | | | | |
|---|---|---|---|---|
| 9,973,374 | B1* | 5/2018 | Ratias | H04W 12/068 |
| 10,943,063 | B1* | 3/2021 | Mccown | G06F 21/31 |
| 2003/0159071 | A1* | 8/2003 | Martinez | G06F 21/31 726/8 |
| 2004/0187029 | A1* | 9/2004 | Ting | G06F 21/32 726/5 |
| 2005/0154913 | A1* | 7/2005 | Barriga | H04L 63/0815 726/4 |
| 2006/0206723 | A1* | 9/2006 | Gil | H04L 63/0861 713/186 |
| 2007/0255963 | A1* | 11/2007 | Pizano | G06F 21/32 713/189 |
| 2013/0067545 | A1* | 3/2013 | Hanes | H04L 9/3231 726/6 |
| 2013/0254533 | A1* | 9/2013 | Welch | G06F 21/32 713/155 |
| 2014/0139318 | A1* | 5/2014 | Malpani | G06F 21/32 340/5.82 |
| 2014/0189808 | A1* | 7/2014 | Mahaffey | G06F 21/6245 726/4 |
| 2014/0195815 | A1* | 7/2014 | Taveau | G06F 21/32 713/186 |
| 2015/0074786 | A1* | 3/2015 | Hwang | H04L 63/0861 726/9 |
| 2016/0070894 | A1* | 3/2016 | Boodaei | H04L 9/0825 713/155 |
| 2017/0331799 | A1* | 11/2017 | Uchiyama | H04L 63/08 |
| 2018/0124023 | A1* | 5/2018 | Qi | H04L 9/0618 |
| 2018/0241728 | A1 | 8/2018 | Burgess et al. | |
| 2019/0036932 | A1 | 1/2019 | Bathen et al. | |
| 2020/0028679 | A1* | 1/2020 | Chumbley | H04L 9/0863 |

FOREIGN PATENT DOCUMENTS

WO 2018156782 A1 8/2018
WO 2018/214133 A1 11/2018

OTHER PUBLICATIONS

PCT Written Opinion for International Application No. PCT/IL2020/050656, dated Aug. 13, 2020, 5pp.

* cited by examiner

METHODS AND SYSTEMS FOR TRUSTED WEB AUTHENTICATION

This application is a National Phase of PCT Patent Application No. PCT/IL2020/050656 having International filing date of Jun. 14, 2020, which claims the benefit of priority of Israel Patent Application No. 267493, filed Jun. 19, 2019, the contents of which are all incorporated herein by reference in their entirety.

TECHNICAL FIELD

The presently disclosed subject matter relates to methods and systems for enabling trusted authentication, in particular to cloud-based services and/or websites.

BACKGROUND

In the web, users need to be authenticated when attempting to access various cloud-based services and/or websites, such as emailing websites, bank accounts, health records, etc.

Most websites still use a username and password to authenticate users. Some websites use physical devices or two-factor authentication (using token and/or mobile phones).

Each method has disadvantages: passwords can be stolen, physical devices are not convenient, and two-factor authentication does not prevent the creation of fake identities, since a one-time SIM card can be used.

Another issue is that one (physical) person may have many unrelated (virtual) identities: several email addresses (private and business), phone numbers and profiles in different social networks. It may also be legitimate to use multiple profiles for business purposes, advertisement and promotional activities. The problem is that illegal activists abuse the web openness and create fake identities to hide their activities.

There is now a need to provide new methods and systems for enabling trusted authentication, in particular to cloud-based services and/or websites.

GENERAL DESCRIPTION

In accordance with certain aspects of the presently disclosed subject matter, there is provided an identification method, comprising:
  providing at least one database storing, for each of a plurality of users, user data comprising:
    biometric data representative of biometric features of the user,
    user identification data comprising at least one or more usernames and passwords, each username and password being associated with a website, the method comprising, by at least one processing unit:
  obtaining biometric data representative of biometric features of a candidate user attempting to be identified by a given website,
  searching, in the database, biometric data matching the biometric data of the candidate user according to a matching criterion, and
  sending to the given website at least a password stored for the candidate user in the database and associated with the given website, wherein the password is encrypted using an encryption mechanism which allows decryption of the password only by the given website.

In addition to the above features, the method according to this aspect of the presently disclosed subject matter can optionally comprise one or more of features (i) to (x) below, in any technically possible combination or permutation:

i. for each user, a password associated with a given website is stored in an encrypted form in the database using a public key of the given web site, wherein the password can be decrypted using a private key available only to the given web site;

ii. the method comprises sending at least a password stored for the candidate user in the database and associated with a username for which the user is attempting to be identified by the website;

iii. the method comprises based on biometric data representative of biometric features of the candidate user, searching, in the database, biometric data matching the biometric data of the candidate user according to a matching criterion, determining a plurality of usernames of the candidate user for the given website, based on an input of the candidate user indicating a given username among said plurality of usernames, sending, to the given website, the given username and at least a password stored for the candidate user in the database and associated with the given username for the given website;

iv. the method comprises decrypting the password of the candidate user by the given website, and authorizing access to the given website by the candidate user based at least on a username of the user and the decrypted password;

v. the database stores, for at least one user, user data comprising, for a given username of the user, a plurality of passwords for a given web site, wherein the method comprises sending to the given website a password which is the most recent one created in the database among the plurality of passwords stored for the candidate user in the database and associated with the given username for the given website, wherein the password is encrypted using an encryption mechanism which allows decryption of the password only by the given website;

vi. the database is a decentralized ledger database;

vii. the database is a distributed database comprising a plurality of elementary databases, wherein each of the elementary databases stores the same data, and wherein adding a new record in one of the elementary databases, propagates in all other elementary databases;

viii. the database stores, for each of a plurality of users, a plurality of distinct records, each record comprising biometric data representative of biometric features of the user, and at least one username and associated password for a given website.

ix. when the user changes from the password to a new password associated with the username and the given web site, the method comprises creating a new record in the database comprising biometric data representative of biometric features of the user, and the username and associated new password for the given website, wherein an indication that the new password has been created after the old password, is present in the database; and x. the biometric data is stored using a unique mathematical representation in the database.

According to another aspect of the presently disclosed subject matter there is provided a method, comprising, by at least one processing unit:

obtaining biometric data representative of biometric features of a candidate user attempting to be registered in a given website, obtaining a username and password provided by the candidate user for the given website, encrypting the password using a public key specific to the given website, storing, in at least one database, user data for said candidate user, the user data comprising said biometric data, said username, and at least said password associated with said username for said given website, wherein the database is searchable for providing, upon request, for said username of said given website, said password in an encrypted form based on said biometric data, wherein the password can be decrypted by a private key available only to the given website.

In addition to the above features, the method according to this aspect of the presently disclosed subject matter can optionally comprise one or more of features (ii) to (x) above, in any technically possible combination or permutation.

According to another aspect of the presently disclosed subject matter there is provided a method comprising, by at least one processing unit:

upon attempt of a candidate user to be identified by a given website based at least on biometric data of the candidate user, obtaining a password of the candidate user for this given website extracted from a database storing, for each of a plurality of users, user data comprising:

biometric data representative of biometric features of the user, user identification data comprising at least one or more usernames and passwords, each username and password being associated with a web site, wherein the password is encrypted using an encryption mechanism which allows decryption of the password only by the given website, and decrypting the password of the candidate user by the given website, and authorizing access to the given web site by the candidate user based at least on the decrypted password.

In addition to the above features, the method according to this aspect of the presently disclosed subject matter can optionally comprise one or more of features (ii) to (x) above, in any technically possible combination or permutation.

According to another aspect of the presently disclosed subject matter there is provided a system configured to, by at least one processing unit:

obtain biometric data representative of biometric features of a candidate user attempting to be identified by a given website, search, in at least one database, biometric data matching the biometric data of the candidate user according to a matching criterion, wherein the at least one database stores, for each of a plurality of users, user data comprising:

biometric data representative of biometric features of the user, user identification data comprising at least one or more usernames and passwords, each username and password being associated with a website, and sending to the given website at least a password stored for the candidate user in the database and associated with the given website, wherein the password is encrypted using an encryption mechanism which allows decryption of the password only by the given website.

In addition to the above features, the system according to this aspect of the presently disclosed subject matter can optionally comprise one or more of features (xi) to (xx) below, in any technically possible combination or permutation.

xi. for each user, a password associated with a given website is stored in an encrypted form in the database using a public key of the given web site, wherein the password can be decrypted using a private key available only to the given web site;

xii. the system is configured to send at least a password stored for the candidate user in the database and associated with a username for which the user is attempting to be identified by the website;

xiii. the system is configured to, based on biometric data representative of biometric features of the candidate user, search, in the database, biometric data matching the biometric data of the candidate user according to a matching criterion, determine a plurality of usernames of the candidate user for the given website, based on an input of the candidate user indicating a given username among said plurality of usernames, send, to the given website, the given username and at least a password stored for the candidate user in the database and associated with the given username for the given web site;

xiv. the system is configured to decrypt the password of the candidate user by the given website, and authorize access to the given website by the candidate user based at least on a username of the user and the decrypted password;

xv. the database stores, for at least one user, user data comprising, for a given username of the user, a plurality of passwords for a given website, the system being configured to send to the given website a password which is the most recent one created in the database among the plurality of passwords stored for the candidate user in the database and associated with the given username for the given website, wherein the password is encrypted using an encryption mechanism which allows decryption of the password only by the given website;

xvi. the database is a decentralized ledger database;

xvii. the database is a distributed database comprising a plurality of elementary databases, wherein each of the elementary databases stores the same data, and wherein adding a new record in one of the elementary databases propagates in all other elementary databases;

xviii. the database stores, for each of a plurality of users, a plurality of distinct records, each record comprising biometric data representative of biometric features of the user, and at least one username and associated password for a given web site;

xix. when the user changes from the password to a new password associated with the username and the given website, the system is configured to create a new record in the database comprising biometric data representative of biometric features of the user, and the username and associated new password for the given website; and xx. the biometric data is stored using a unique mathematical representation in the database.

According to another aspect of the presently disclosed subject matter there is provided a system configured to, by at least one processing unit:

obtain biometric data representative of biometric features of a candidate user attempting to be registered in a given website, obtain a username and password provided by the candidate user for the given website, encrypt the password using a public key specific to the given website, store, in at least one database, user data for said candidate user, the user data comprising said biometric data, said username, and at least said password associated with said username for said given website, wherein the database is searchable for providing, upon request, for said username of said given website, said password in an encrypted form based on said biometric data, wherein the password can be decrypted by a private key available only to the given website.

In addition to the above features, the system according to this aspect of the presently disclosed subject matter can optionally comprise one or more of features (xi) to (xx) above, in any technically possible combination or permutation.

According to another aspect of the presently disclosed subject matter there is provided a system configured to, by at least one processing unit:

upon attempt of a candidate user to be identified by a given website based at least on biometric data of the candidate user, obtain a password of the candidate user for this given website extracted from a database storing, for each of a plurality of users, user data comprising:

biometric data representative of biometric features of the user, user identification data comprising at least one or more usernames and passwords, each username and password being associated with a website, wherein the password is encrypted using an encryption mechanism which allows decryption of the password only by the given website, decrypt the password of the candidate user by the given website, and authorize access to the given website by the candidate user based at least on the decrypted password.

In addition to the above features, the system according to this aspect of the presently disclosed subject matter can optionally comprise one or more of features (xi) to (xx) below, in any technically possible combination or permutation.

According to another aspect of the presently disclosed subject matter there is provided a non-transitory storage device readable by a machine, tangibly embodying a program of instructions executable by the machine to perform a method comprising:

obtaining biometric data representative of biometric features of a candidate user attempting to be identified by a given website, searching, in at least one database, biometric data matching the biometric data of the candidate user according to a matching criterion, wherein the at least one database stores, for each of a plurality of users, user data comprising:

biometric data representative of biometric features of the user, user identification data comprising at least one or more usernames and passwords, each username and password being associated with a web site, and sending to the given website at least a password stored for the candidate user in the database and associated with the given website, wherein the password is encrypted using an encryption mechanism which allows decryption of the password only by the given website.

In addition to the above features, the executed method according to this aspect of the presently disclosed subject matter can optionally comprise one or more of features (i) to (x) above, in any technically possible combination or permutation.

According to another aspect of the presently disclosed subject matter there is provided a non-transitory storage device readable by a machine, tangibly embodying a program of instructions executable by the machine to perform a method comprising:

obtaining biometric data representative of biometric features of a candidate user attempting to be registered in a given website, obtaining a username and password provided by the candidate user for the given web site, encrypting the password using a public key specific to the given website, storing, in at least one database, user data for said candidate user, the user data comprising said biometric data, said username, at least said password associated with said username for said given website, wherein the database is searchable for providing, upon request, for said username of said given website, said password in an encrypted form based on said biometric data, wherein the password can be decrypted by a private key available only to the given website.

In addition to the above features, the executed method according to this aspect of the presently disclosed subject matter can optionally comprise one or more of features (i) to (x) above, in any technically possible combination or permutation.

According to another aspect of the presently disclosed subject matter there is provided a non-transitory storage device readable by a machine, tangibly embodying a program of instructions executable by the machine to perform a method comprising:

upon attempt of a candidate user to be identified by a given web site based at least on biometric data of the candidate user, obtaining a password of the candidate user for this given website extracted from a database storing, for each of a plurality of users, user data comprising biometric data representative of biometric features of the user, user identification data comprising at least one or more usernames and passwords, each username and password being associated with a website, wherein the password is encrypted using an encryption mechanism which allows decryption of the password only by the given website, decrypting the password of the candidate user by the given website, and authorizing access to the given web site by the candidate user based at least on the decrypted password.

In addition to the above features, the executed method according to this aspect of the presently disclosed subject matter can optionally comprise one or more of features (i) to (x) above, in any technically possible combination or permutation.

According to some embodiments, the proposed solution provides a trusted authentication for accessing websites, thereby improving security, robustness, and protection of data and life privacy.

According to some embodiments, the proposed solution allows a user to create strong passwords for a plurality of web sites, without requiring from the user to remember these passwords.

According to some embodiments, the proposed solution reduces the risk of fraud and forgery in user authentication.

According to some embodiments, the proposed solution reduces the risk of password theft and/or cracking by a third party.

According to some embodiments, the proposed solution prevents creation of multiple fake identifies by a user.

According to some embodiments, the proposed solution improves both security and flexibility of user authentication.

According to some embodiments, the proposed solution adapts to existing websites which propose traditional authentication based on username and password, and proposes an alternative trusted authentication compatible with this traditional authentication.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "obtaining", "providing", "searching", "sending", "storing", "encrypting/decrypting", "authorizing" or the like, refer to the action(s) and/or process(es) of a processing unit that manipulates and/or transforms data into other data, said data represented as physical, such as electronic, quantities and/or said data representing the physical objects.

The term "processing unit" covers any computing unit or electronic unit with data processing circuitry that may perform tasks based on instructions stored in a memory, such as a computer, a server, a chip, a processor, a hardware processor, etc. It encompasses a single processor or multiple processors, which may be located in the same geographical zone or may, at least partially, be located in different zones and may be able to communicate together.

The term "memory" as used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1:
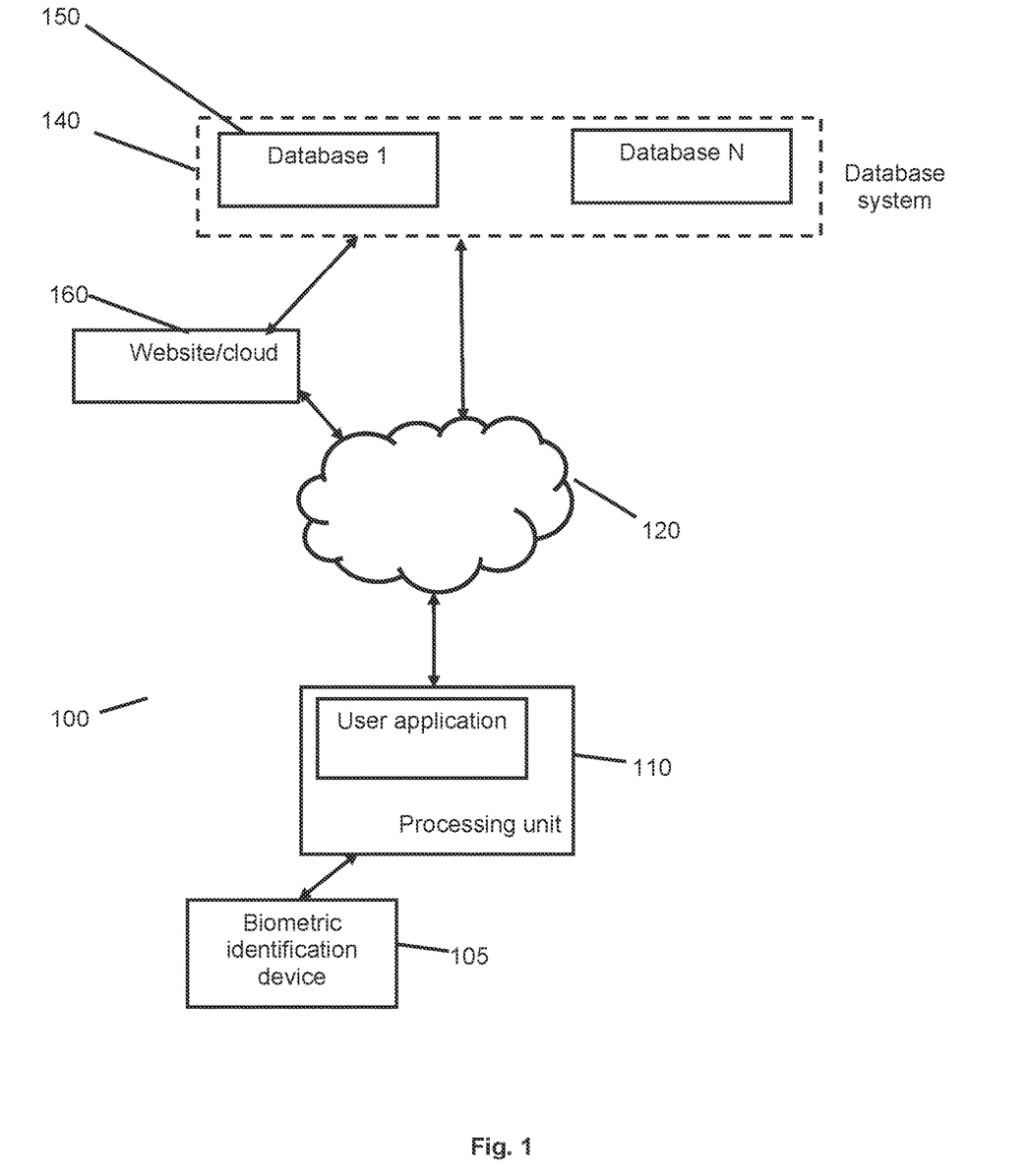
FIG. 1 illustrates a system which can be used to perform one or more methods described hereinafter.

FIG. 1 illustrates a system 100, which can be used to perform one or more methods described hereinafter.

As shown, at least one biometric identification device (or biometric sensor) 105 can be provided. The biometric identification device 105 can be used to collect, or to sense, from a user, biometric data, representative of biometric features of the user.

Non-limitative examples of a biometric identification device 105 include:

Fingerprint sensor, configured to sense fingerprint(s) of the user;

Facial scanning device, configured to provide a 2D or 3D representation of the user's face and/or body;

Eyes sensing device;

Iris sensing device;

Camera; and

Other devices.

The biometric identification device 105 is typically located on the side of the user. In some embodiments, the biometric identification device 105 is embedded in a portable device of the user, such as, but not limited to a cellphone or computer of the user.

As shown in FIG. 1, a user application is provided and can be executed on a processing unit 110. The user application can provide an interface allowing a user to register his personal user data, and biometric data, as explained hereinafter.

As shown in FIG. 1, a database system 140 is provided, which is suitable for storing data representative of the users.

According to some embodiments, the database system 140 is a distributed database, which comprises a plurality of elementary databases 150.

According to some embodiments, each of the elementary databases 150 stores the same data. According to some embodiments, a modification of the data (especially adding a new record) in one of the elementary databases, propagates in all other elementary databases.

According to some embodiments, the database system 140 is a decentralized ledger database.

According to some embodiments, each of the elementary databases 150 stores a plurality of blocks (created over time), wherein a hash of previous block N−1 is stored in current block N (and so forth). As a consequence, alteration of the data in the database is would be impractical.

According to some embodiments, the database system 140 can rely on blockchain technology to store data. This can include storing data using a plurality of blocks, wherein a hash of a previous block N−1 is stored in current block N, and so forth, thereby preventing corruption of data. In particular, data in any given block cannot be altered retroactively without alteration of all subsequent blocks, which requires authorization of the other databases, or authorization of all users of the databases.

In addition, according to some embodiments, no single centralized administration of the different databases 150 is used.

According to some embodiments, each of the elementary databases 150 does not allow modification of stored data, but only addition of new data.

As shown in FIG. 1, data can be exchanged using a network 120, such as, but not limited to, the Internet.

Data can be exchanged between the user (e.g. user application/biometric identification device), the database system 140 and one or more websites 160 (websites include e.g. webpages, cloud based services, etc.).

Figure 1A:
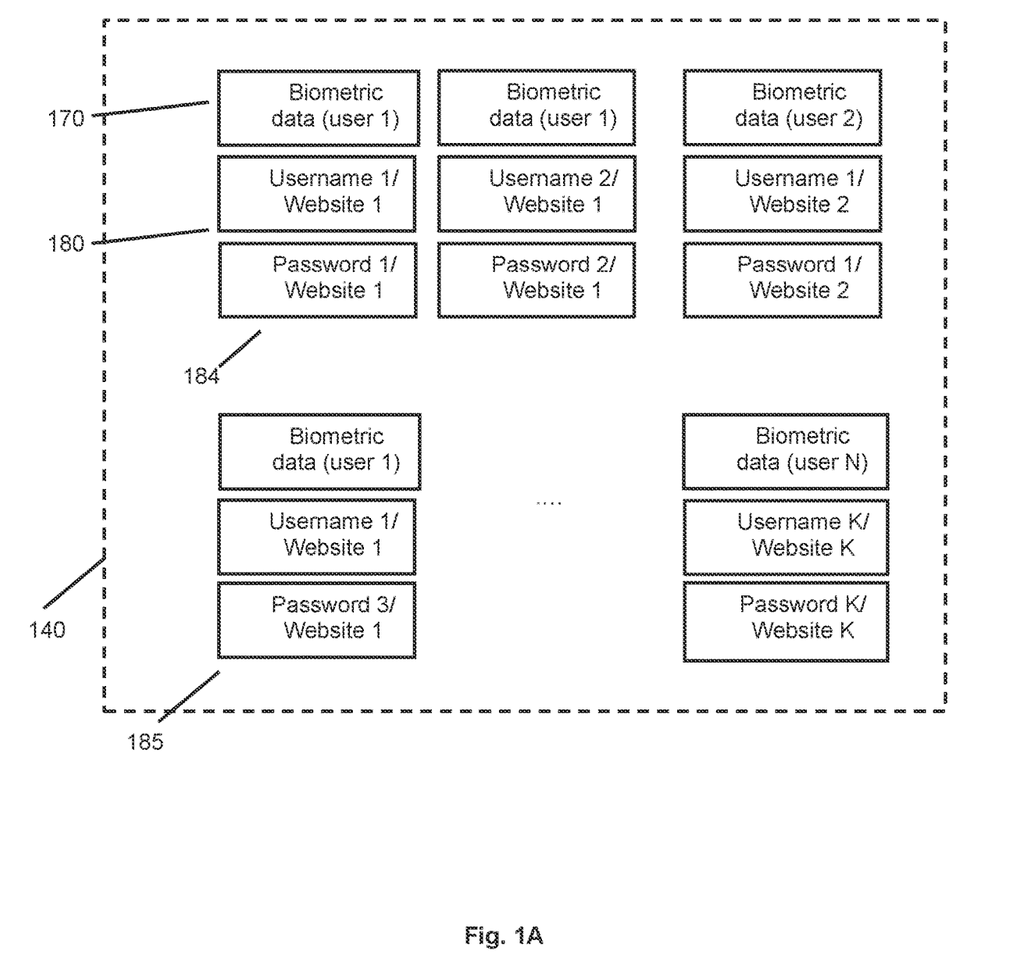
FIG. 1A illustrates data of users that can be stored in a database.

FIG. 1A illustrates data that can be stored in the database system 140 (in particular, this data can be stored in each of the distributed databases 150 of the database system 140).

The data can comprise biometric data 170, stored for each of a plurality of users.

Biometric data can comprise e.g. data representative of the fingerprint, eyes, iris, face, body, iris, etc. of the user.

In some embodiments, biometric data is provided by the biometric identification device 105 (e.g. a picture, etc.) and is stored using a mathematical representation which is unique for each biometric data. For example, a hash can be used.

In some embodiments, for a given user, a plurality of biometric data can be stored.

According to some embodiments, for a given website, a plurality of different biometric data (iris, fingerprint, etc.) is stored for each user. The combination of different biometric data can differ between the websites.

According to some embodiments each website can rely on a different type of biometric identification, and therefore, for each user, a plurality of biometric data is stored (for example iris picture for website 1, picture for website 2, and fingerprint data for website 3, etc.).

According to some embodiments, the database system 140 can further store user identification data 180. This user identification data 180 can comprise, for each user, one or more passwords, wherein each password is associated with a website.

In particular, for a given website, the password of the user is the password used by the user to access his account in this given website.

The user identification data 180 can also comprise one or more usernames, wherein each username is associated with a password for a given website. Indeed, a given user can have different accounts for a given website, and therefore, a different username and associated password can be stored for each account of the user for the given website.

According to some embodiments, for a given user, a plurality of different records are stored in the database (these records may be spread in the database). Each record can comprise:
  biometric data representative of biometric features of the user,
  a username,
  a password,
  data representative of a given website for which these data are relevant.

The records of a given user can be spread in the database, and their location depends on the time at which they have been created.

In some embodiments, for a given username of a user, user identification data 180 can comprise a plurality of passwords associated with a given website.

This can be due to various reasons.

In some embodiments, for a given username of a website, when a user changes his password from an old password to a new password for the given web site, the old password is not deleted from the user identification data 180 but is kept, and the new password is stored in the user identification data 180 in addition to the old password. Information indicating that the new password is the "correct and updated" password can be stored in the database system 150. For example, this information can be the fact that the new password was created in the database at a more recent time, or the fact that the new password is located in the database at a higher location, or an adapted pointer can be stored in the database, etc.

In some embodiments, when the user changes his password for a given username of a given website, a new record is added in the database, which comprises:
  biometric data representative of biometric features of the user,
  the username and associated new password for the given web site,
  data representative of the given website (e.g. address, etc.).

Although the new record has been created, in some embodiments, the previous record is not deleted.

An example is shown in FIG. 1A, in which user 1 has changed (for his account "username 1" for "website 1") his old password "password 1" to a new password "password 3". Therefore, a new record 185 is created in the database, in addition to the previous record 184.

In some embodiments, the user can have a plurality of accounts for a given website. Therefore, a plurality of passwords can be stored for this user for this given website, e.g. at least one for each account. This is shown in FIG. 1A, in which "user 1" has two accounts "username 1" and "username 2", and a password for each username.

According to some embodiments, and as explained hereinafter, the password(s) stored for each user can be stored in an encrypted form.

According to some embodiments, a password stored for a user in the database and associated with a given website (for a given username), is encrypted using an encryption mechanism which allows decryption of the password only by the given web site.

For example, for each user, a password associated with a given web site (for a given username) is stored in an encrypted form in the database using a public key of the given website, wherein the password can be decrypted using a private key available only to the given website.

By storing data representative of the accounts of the users as explained above, this helps tracing all accounts of a given user for all websites which participate in the trusted authentication described hereinafter.

Figure 2:
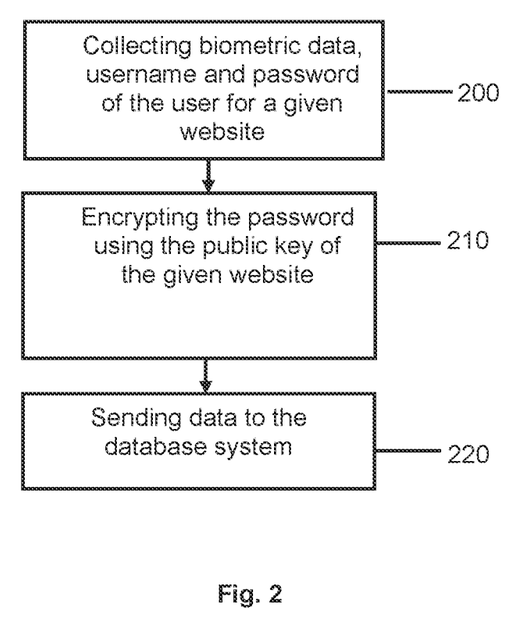
FIG. 2 illustrates a registration method of a user based on biometric data.

Attention is now drawn to FIG. 2.

When a user of a given website intends to be identified using the trusted authentication described hereinafter, he can use e.g. the user application (see FIG. 1) to provide, in a registration phase (operation 200):
  biometric data (the user can use the biometric identification device 105 which senses the relevant biometric features of the user and provides the biometric data of the user to the user application, using e.g. wire/wireless communication); and
  the username and password that he uses for this given website.

In some embodiments, the user can provide further data, such as additional data relevant for this given website.

In some embodiments, the website itself comprises an interface which allows a user to register his biometric data, password and username (see reference 300 in FIG. 3), which will allow him later on to enter the website by providing biometric identification without providing password.

The biometric data and the password can be sent to the database system 140, for their storage. According to some embodiments, the password is first encrypted (operation 210) using e.g. a public key of the given website (this encryption can be performed e.g. by the user application, or by another server which stores the public key), and sent to the database system 140. If necessary, other data stored for the user for this website can be encrypted using the public key of the website (e.g. username etc.).

The data (biometric data, encrypted password, and, if necessary, additional user data) are sent (operation 220) to the database system 140 for their storage. As explained above, a new record is added to the database 150.

The user can repeat these operations (200, 210 and 220) for a plurality of websites (in some embodiments, the biometric data is collected once, and then the user provides a list of usernames and passwords, for each of a plurality of websites).

Figure 4:
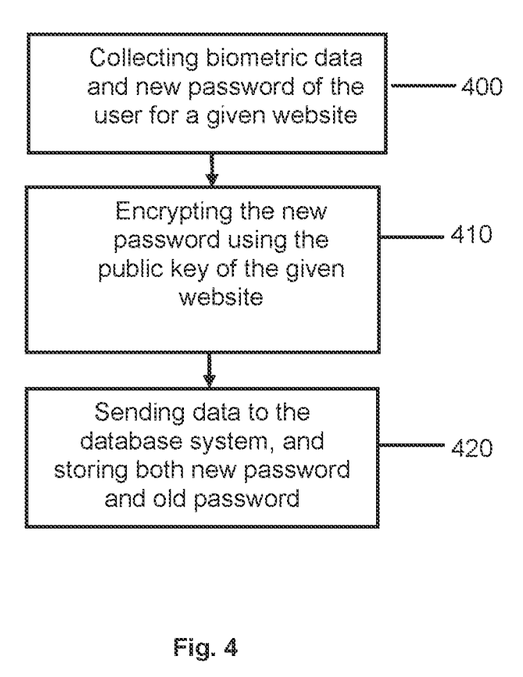
FIG. 4 illustrates a method of handling the update of a password of a user for a web site.

Attention is drawn to FIG. 4, which provides a method of changing a password for a given website.

Assume a user has performed the method of FIG. 2 for a password (hereinafter old password) associated with a given website (for a given username), and he now wishes to change his old password to a new password for this given website (for this given username).

The method can comprise (operation 400) collecting biometric data of the user, and the new password of the user (the user can enter the new password using the user application, or he can enter the new password on the website which then provides this new password e.g. to the user application to a server or processing unit).

The method can comprise (operation 410) encrypting the new password using e.g. a public key of the given website (this is similar to operation 210).

The method can comprise sending (operation 420) the data to the database system 140. The encrypted new password can be stored as a new record in the database system 140 (this new record can comprise the biometric data, the username of the user, the new password, and data indicative of the website for which these data are relevant).

As mentioned above, information indicates in the database system 140 that the new password is the latest and relevant password (e.g. a pointer indicating the date of creation of the password in the database, location of the new password relative to the old password, e.g. in a more recent block, etc.).

Figure 5:
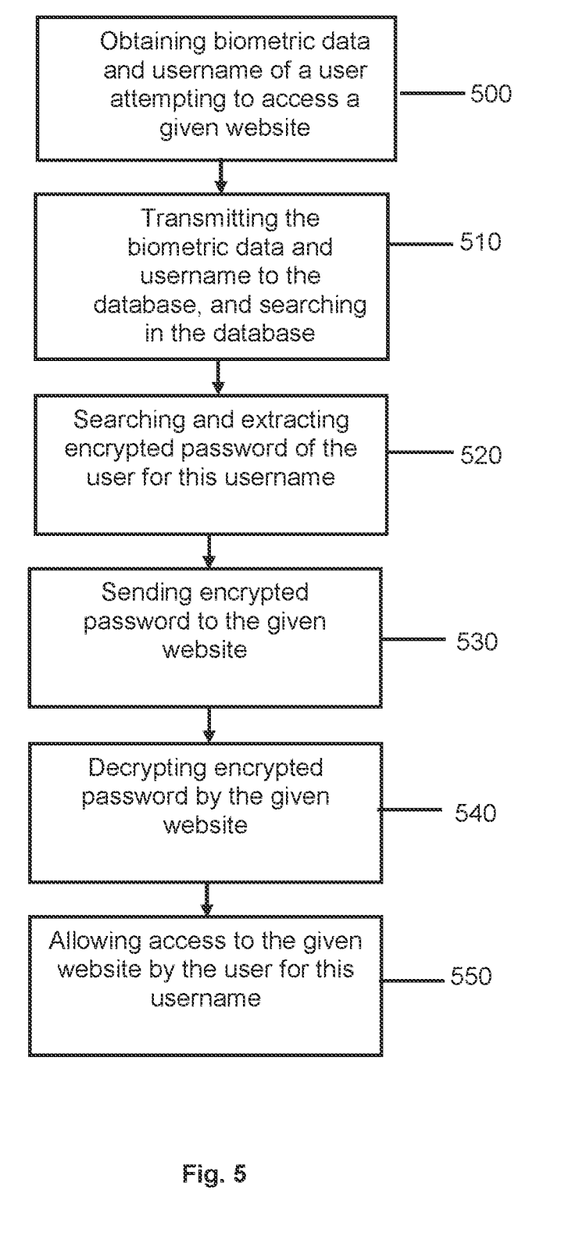
FIG. 5 illustrates an embodiment of a method of authenticating a user based on biometric data provided by the user, and authorizing access of the user to a web site.

Attention is now drawn to FIG. 5.

Assume a user (who has already performed a registration procedure for a given website, such as the registration procedure described in FIG. 2 or FIG. 4) intends to access the given website using e.g. his computer or cellphone.

The user needs to provide (operation 500) biometric data. He can use the biometric identification device 105. The biometric data is transmitted (operation 510) from the biometric identification device 105 to the database system 140 (this transmission can be controlled e.g. by the user application and/or by the given website and/or by another server).

The method can comprise searching (operation 520) for this biometric data in at least one database 150 of the database system 140. The database 150 which is chosen to perform this search can be e.g. the closest database (physical distance), or the database which is currently the less loaded, etc. This is not limitative.

This search can be performed e.g. by the user application and/or by the given website and/or by a processing unit associated with the database.

If this search reveals that biometric data stored in the database matches the biometric data of the user (according to some matching criterion, which can define the maximal difference that can be accepted between the biometric data of the user and the biometric data stored in the database), then the password associated with this given website for this user can be extracted from the database and can be sent (operation 530) to the given website. Transmission of the database can be controlled by a processing unit associated with the database, or by the user application, or by the given website.

In some embodiments, the user provides (e.g. to the website, or using the user application) the username for which he wants to access the website. Therefore, the search can extract only the relevant password associated with the username for this website. This embodiment in illustrated in FIG. 5.

The given website (or another processing unit associated with the given website) can then decrypt (operation 540) the encrypted password using its private key (which is the only key that can decrypt the password, and which is available to the given web site only).

The given website now has access to the password of the user for this username, and can then authorize access (operation 550) of the user accordingly, based on the username of the user (provided by the user) and on the unencrypted password of the user.

In other embodiments (see FIG. 5A), the user does not provide his username at the beginning of the identification process.

Therefore, if the search (operation 510 in FIG. 5A) reveals that the biometric data of the user corresponds to a plurality of usernames and passwords in the database for this website (operation 511), then the method can comprise requesting from the user to select the relevant username for which he wants to be identified (operation 512). Based on this input, the password associated with the selected username will be extracted and sent to the website (operation 513). The relevant username can be also communicated to the website (e.g. from the database, or from the user application).

Figure 5A:
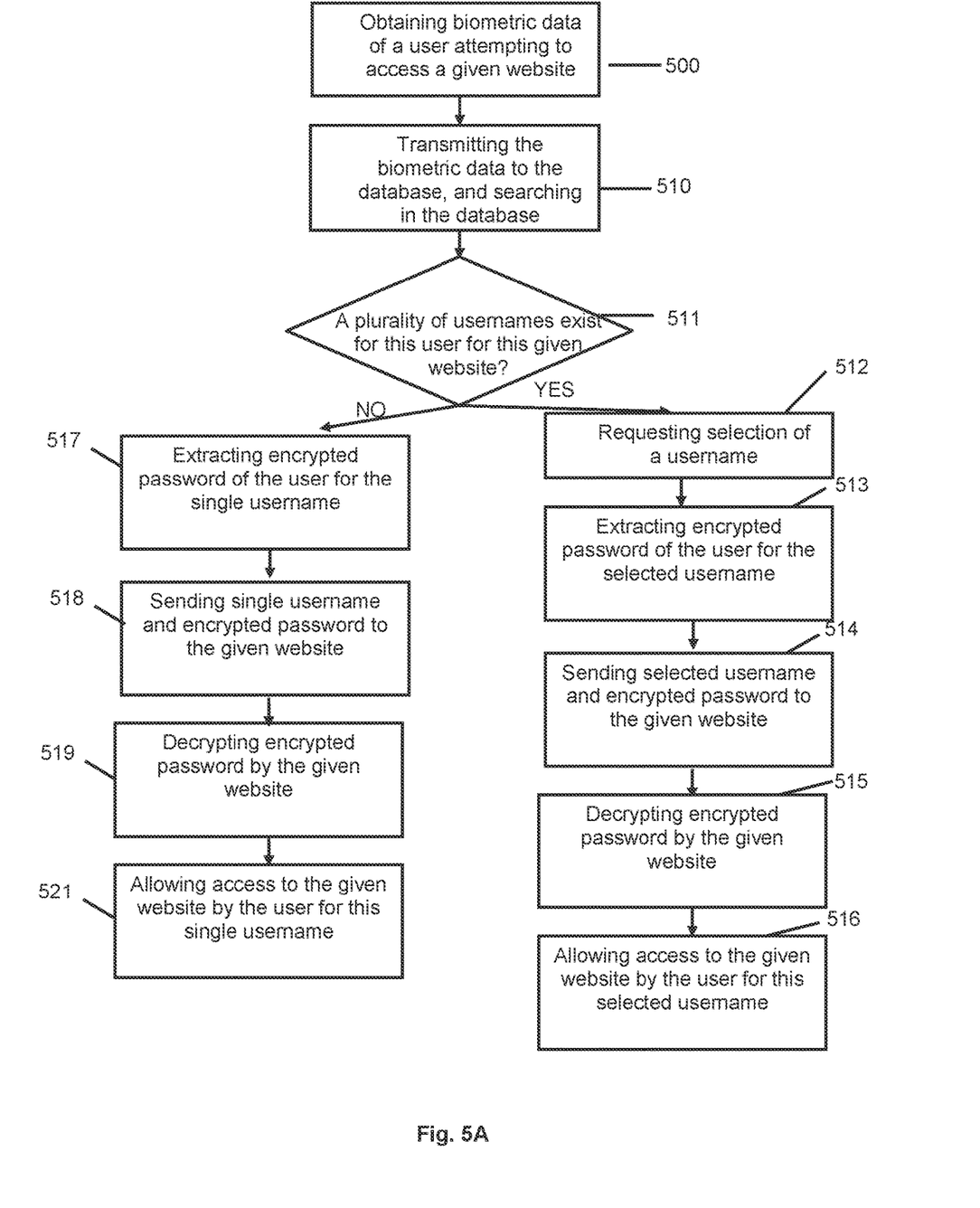
FIG. 5A illustrates another embodiment of a method of authenticating a user based on biometric data provided by the user, and authorizing access of the user to a website.

The method can then comprise decrypting the encrypted password (operation 515) by the given website and allowing access to the given website by the user for this selected username (operation 516).

If the search reveals that the biometric data of the user corresponds to a single username for this website (operation 511), then the corresponding password, together with the single username, can be extracted and sent to the website (operations 517-518).

The method can then comprise decrypting the encrypted password (operation 519) by the given website and allowing access to the given website by the user for this single username (operation 521).

In both methods of FIGS. 5 and 5A, if a plurality of passwords is stored for this given website, for the selected username in FIG. 5, or for the single username in FIG. 5A, then the most recent password is extracted and sent to the given website.

As mentioned above, the password is generally encrypted, and therefore the encrypted password is extracted and sent to the given website.

In some embodiments, further data can be sent to the given website, such as username, personal data, etc.

Figure 3:
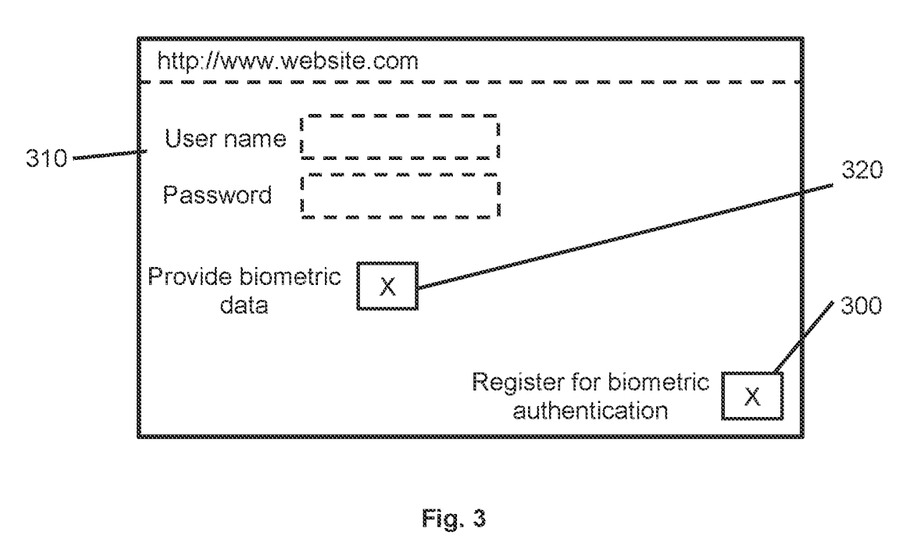
FIG. 3 illustrates an example of an interface of a web site.

The user can therefore access each website based only on biometric data, and does not need to enter a password each time for each website (although he may do so if the website keeps this option as illustrated in FIG. 3).

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. An identification method, comprising:
    providing at least one database storing, for each of a plurality of users, user data comprising:
        biometric data representative of biometric features of the user,
        user identification data comprising at least one or more usernames and passwords, each username and password being associated with a website,
    wherein the at least database is a decentralized ledger database,
    the method comprising, by at least one processor and memory circuitry:
    obtaining candidate biometric data representative of candidate biometric features of a candidate user attempting to be identified by a given website,
    searching, in the database, biometric data matching the candidate biometric data of the candidate user according to a matching criterion,
    sending to the given website at least a candidate password stored for the candidate user in the database and associated with the given website, wherein the candidate password is encrypted using an encryption mechanism which allows decryption of the password only by the given website,
    determining a plurality of usernames of the candidate user for the given website,
    based on an input of the candidate user indicating a given username among said plurality of usernames, sending, to the given website, the given username and at least a password stored for the candidate user in the database and associated with the given username for the given website.

2. The identification method of claim 1, wherein, for each user, a password associated with a given web site is stored in an encrypted form in the database using a public key of the given website, wherein the password can be decrypted using a private key available only to the given website.

3. The identification method of claim 1, comprising sending at least a password stored for the candidate user in the database and associated with a username for which the user is attempting to be identified by the website.

4. The identification method of claim 1, comprising:
    based on biometric data representative of biometric features of the candidate user,
    searching, in the database, biometric data matching the biometric data of the candidate user according to a matching criterion.

5. The method of claim 1, wherein the database stores, for at least one user, user data comprising, for a given username of the user, a plurality of passwords for a given website, wherein the method comprises:
    sending to the given website a password which is the most recent one created in the database among the plurality of passwords stored for the candidate user in the database and associated with the given username for the given website, wherein the password is encrypted using an encryption mechanism which allows decryption of the password only by the given website.

6. The identification method of claim 1, wherein the database is a distributed database comprising a plurality of elementary databases, wherein each of the elementary databases stores the same data, and wherein adding a new record in one of the elementary databases, propagates in all other elementary databases.

7. The identification method of claim 1, wherein the database stores, for each of a plurality of users, a plurality of distinct records, each record comprising:
    biometric data representative of biometric features of the user, and
    at least one username and associated password for a given web site.

8. The identification method of claim 7, wherein when the user changes from the password to a new password associated with the username and the given website, the method comprises creating a new record in the database comprising:
    biometric data representative of biometric features of the user, and
    the username and associated new password for the given web site,
wherein an indication that the new password has been created after the old password, is present in the database.

9. The method of claim 1, comprising:
    obtaining biometric data representative of biometric features of a candidate user attempting to be registered in a given website,
    obtaining a username and password provided by the candidate user for the given website,
    encrypting the password using a public key specific to the given website,
    storing, in at least one database, user data for said candidate user, the user data comprising:
        said biometric data,
        said username, and
        at least said password associated with said username for said given website,
    wherein the database is a decentralized ledger database,
    wherein the database is searchable for providing, upon request, for said username of said given website, said password in an encrypted form based on said biometric data,
    wherein the password can be decrypted by a private key available only to the given website.

10. The method of claim 1, comprising:
    upon attempt of a candidate user to be identified by a given website based at least one biometric data of the candidate user, obtaining a password of the candidate user for this given website extracted from a database storing, for each of a plurality of users, user data comprising:
        biometric data representative of biometric features of the user, user identification data comprising at least one or more usernames and passwords, each username and password being associated with a website,
wherein the database is a decentralized ledger database,
wherein the password is encrypted using an encryption mechanism which allows decryption of the password only by the given website, and
decrypting the password of the candidate user by the given website, and
authorizing access to the given website by the candidate user based at least on the decrypted password.

11. A system configured to, by at least one processor and memory circuitry:
obtain biometric data representative of biometric features of a candidate user attempting to be identified by a given website,
search, in at least one database, biometric data matching the biometric data of the candidate user according to a matching criterion,
wherein the at least one database stores, for each of a plurality of users, user data comprising:
biometric data representative of biometric features of the user,
user identification data comprising at least one or more usernames and passwords, each username and password being associated with a website,
wherein the database is a decentralized ledger database, and
send to the given website at least a password stored for the candidate user in the database and associated with the given website, wherein the password is encrypted using an encryption mechanism which allows decryption of the password only by the given web site.

12. The system of claim 11, wherein, for each user, a password associated with a given website is stored in an encrypted form in the database using a public key of the given website, wherein the password can be decrypted using a private key available only to the given website.

13. The system of claim 11, configured to send at least a password stored for the candidate user in the database and associated with a username for which the user is attempting to be identified by the website.

14. The system of claim 11, configured to:
based on biometric data representative of biometric features of the candidate user, search, in the database, biometric data matching the biometric data of the candidate user according to a matching criterion,
determine a plurality of usernames of the candidate user for the given website,
based on an input of the candidate user indicating a given username among said plurality of usernames, send, to the given web site, the given username and at least a password stored for the candidate user in the database and associated with the given username for the given website.

15. The system of claim 11, wherein the database stores, for at least one user, user data comprising, for a given username of the user, a plurality of passwords for a given website, the system being configured to:
send to the given web site a password which is the most recent one created in the database among the plurality of passwords stored for the candidate user in the database and associated with the given username for the given website, wherein the password is encrypted using an encryption mechanism which allows decryption of the password only by the given website.

16. The system of claim 11, wherein the database is a distributed database comprising a plurality of elementary databases, wherein each of the elementary databases stores the same data, and wherein adding a new record in one of the elementary databases propagates in all other elementary databases.

17. The system of claim 11, wherein, the database stores, for each of a plurality of users, a plurality of distinct records, each record comprising:
biometric data representative of biometric features of the user, and
at least one username and associated password for a given web site.

18. The system of claim 17, wherein when the user changes from the password to a new password associated with the username and the given website, the system is configured to create a new record in the database comprising:
biometric data representative of biometric features of the user, and
the username and associated new password for the given web site,
wherein an indication that the new password has been created after the old password, is present in the database.

19. The system of claim 11, configured to:
obtain biometric data representative of biometric features of a candidate user attempting to be registered in a given website,
obtain a username and password provided by the candidate user for the given website,
encrypt the password using a public key specific to the given website,
store, in at least one database, user data for said candidate user, the user data comprising:
said biometric data,
said username, and
at least said password associated with said username for said given website,
wherein the database is a decentralized ledger database,
wherein the database is searchable for providing, upon request, for said username of said given website, said password in an encrypted form based on said biometric data,
wherein the password can be decrypted by a private key available only to the given website.

20. A system configured to, by at least one processor and memory circuitry:
upon attempt of a candidate user to be identified by a given website based at least one biometric data of the candidate user, obtain a password of the candidate user for this given website extracted from a database storing, for each of a plurality of users, user data comprising:
biometric data representative of biometric features of the user,
user identification data comprising at least one or more usernames and passwords, each username and password being associated with a website,
wherein the database is a decentralized ledger database,
wherein the password is encrypted using an encryption mechanism which allows decryption of the password only by the given website,
decrypt the password of the candidate user by the given website, and authorize access to the given website by the candidate user based at least on the decrypted password.

\* \* \* \* \*